(12) United States Patent
Huotari

(10) Patent No.: US 7,910,045 B2
(45) Date of Patent: Mar. 22, 2011

(54) ARRANGEMENT AND METHOD FOR HEATING AN ELECTRICAL CONDUCTOR

(75) Inventor: Pekka Huotari, Kotalahti (FI)

(73) Assignee: Maillefer S.A., Ecublens (CH)

( * ) Notice: Subject to any disclaimer, the term of this patent is extended or adjusted under 35 U.S.C. 154(b) by 382 days.

(21) Appl. No.: 11/794,721

(22) PCT Filed: Jun. 2, 2005

(86) PCT No.: PCT/FI2005/050190
§ 371 (c)(1),
(2), (4) Date: Jul. 5, 2007

(87) PCT Pub. No.: WO2006/072650
PCT Pub. Date: Jul. 13, 2006

(65) Prior Publication Data
US 2008/0093005 A1    Apr. 24, 2008

(30) Foreign Application Priority Data
Jan. 10, 2005  (FI) ...................................... 20055014

(51) Int. Cl.
| | |
|---|---|
| B29C 35/08 | (2006.01) |
| B29C 67/00 | (2006.01) |
| B29C 35/12 | (2006.01) |
| B29C 35/14 | (2006.01) |
| B29C 47/92 | (2006.01) |
| B29C 47/96 | (2006.01) |
| H05B 6/00 | (2006.01) |
| H05B 7/00 | (2006.01) |
| H05B 6/02 | (2006.01) |
| G01B 11/00 | (2006.01) |
| B29B 13/02 | (2006.01) |
| B29B 13/00 | (2006.01) |
| B29B 15/00 | (2006.01) |
| B28B 17/00 | (2006.01) |

(52) U.S. Cl. ........ 264/405; 264/486; 264/472; 264/464; 264/409; 425/174.8 R; 425/141

(58) Field of Classification Search .................. 264/486, 264/472, 405, 464, 409; 425/174.8, 141
See application file for complete search history.

(56) References Cited

U.S. PATENT DOCUMENTS
3,311,947 A * 4/1967 Fenley .......................... 425/141
(Continued)

FOREIGN PATENT DOCUMENTS
JP    A-53-040883    4/1978
(Continued)

OTHER PUBLICATIONS

Slukhotski et al., "Inductors for induction heating", *Energia*, Leningrad, 1974, p. 164.
(Continued)

*Primary Examiner* — Khanh Nguyen
*Assistant Examiner* — Matthew Hoover
(74) *Attorney, Agent, or Firm* — Oliff & Berridge, PLC

(57) ABSTRACT

The invention relates to an arrangement for inductively heating an electrical conductor after the extrusion head in a process of manufacturing electrical cables (8) having insulation layer on the electrical conductor. The arrangement comprises a first distinctive part having induction means (5), and a second distinctive part having guide means (4) and provided in a splice box (3) for directing the magnetic field created with the induction means (5) to protect external parts from heating.

23 Claims, 3 Drawing Sheets

U.S. PATENT DOCUMENTS

| | | | | |
|---|---|---|---|---|
| 4,523,068 A | * | 6/1985 | Lund et al. | 219/633 |
| 2004/0234640 A1 | * | 11/2004 | Jung | 425/131.1 |

FOREIGN PATENT DOCUMENTS

| JP | A-53-056275 | 5/1978 |
|---|---|---|
| JP | A-57-205916 | 12/1982 |
| JP | A-58-040709 | 3/1983 |
| JP | B-62-37487 | 8/1987 |
| JP | A-04-014793 | 1/1992 |
| JP | A-10-318932 | 4/1998 |
| JP | A-10-154426 | 9/1998 |

OTHER PUBLICATIONS

Notification of Reason for Refusal in Japanese Patent Application No. 2007-549919, mailed Oct. 5, 2010.

* cited by examiner

ARRANGEMENT AND METHOD FOR HEATING AN ELECTRICAL CONDUCTOR

FIELD OF THE INVENTION

The present invention relates to an arrangement for inductively heating an electrical conductor after the extrusion head in a process of manufacturing electrical cables having a cross-linkable insulation layer surrounding the electrical conductor. Additionally, the present invention relates to a method for inductively heating an electrical conductor after the extrusion head in a process of manufacturing electrical cables having insulation layers surrounding the electrical conductor.

BACKGROUND OF THE INVENTION

Different means are known to enhance the production speed of electrical cables. The production speed is significantly dependent on how efficiently the insulation layer(s) of the extruded cable can be heated to the temperature necessary for the crosslinking reaction. The main limiting factor of the heating is the low heat conduction rate inside the insulation. Therefore different arrangements have been used to speed up the heating rate of the insulation layer. These arrangements comprise preheaters for heating the electrical conductor to a temperature above the ambient temperature prior to entering the extrusion head of the production line for heating the insulation layer also from the inside. However, this preheating is limited because of, for instance, copper oxidation, conductor tape deformation and moisture-block material degradation. Also radiant heat sources have been used, but the maximum admissible temperature of the outer surface of the extruded cable limits the utilisation of these radiant heat sources. Furthermore, inductive post-heaters are used for this heating purpose after the extrusion of the insulation layer of the cable.

PRIOR ART

Known arrangements for using inductive post-heating comprise inductively heating the extrusion tip and the die in order to promote crosslinking of the extruded insulation layer. Also is known to inductively heat the electrical conductor of a cable by a compact inductive heater located downstream of the extrusion head.

In these prior art arrangements the post-heating is provided by an add-on equipment in the extrusion line of an insulation layer of a cable. Therefore these known equipment are separate compact devices that may be added to a extrusion line.

One of the disadvantages associated with the prior art inductive heating arrangements is that at production changes, additional equipment, such as X-ray measuring device, has to be removed to gain access to the inductive heating device for maintenance, dimensional change purposes or other process needs related to the inductive heating device.

Another disadvantage associated with the prior art is having both the coil and the protective field guiding elements (typically ferrites) in the same construction. This makes individual coils heavy, expensive and difficult to clean and maintain.

BRIEF DESCRIPTION OF THE INVENTION

It is thus an object of the present invention to provide an arrangement and method for overcoming the above disadvantages. The objects of the invention are achieved by an arrangement, which is characterized in that the arrangement comprises a first distinctive part having induction means and a second distinctive part having guide means and provided in a splice box for directing the magnetic field created with the induction means to protect the splice-box from heating.

Additionally, objects of the invention are achieved by a method, which is characterized by the steps of extruding a insulation layer through an extrusion head on a electrical conductor in order to produce an electrical cable creating a magnetic field by induction means, and directing the magnetic field created with the induction means by guide means provided in a splice box in order to protect external parts from heating.

Thus the arrangement of the present invention also protects splice-box and other external parts of the splice box from heating. Other external parts may be any parts outside the splice-box.

The preferred embodiments of the invention are disclosed in the dependent claims.

The invention is based on the idea of providing an arrangement and a method for inductively heating the electrical conductor of an electrical cable after the extrusion step such as to provide a modular approach for the inductive heating of the electrical conductor of an electrical cable. This simple construction for the inductive post-heater comprises induction means, preferably a coil, mounted downstream of the extrusion head for generating a magnetic field and guide means, preferably ferrite cores, located in the splice box to pre-vent inductive heating of the splice-box itself. Therefore the solution of the pre-sent invention comprises distinctive induction means mounted around the electrical cable and distinctive guide means mounted in a splice box around the induction means. This arrangement allows for easy changing of the coil during production stops when the splice-box is open.

An advantage of the arrangement and method of the invention is the modular approach for the post-heating of the electrical conductor after the extrusion of the insulating layer, which provides a simple construction with improved ergonomy for the heater and easier maintenance of the heater, as well as an efficient method for post-heating the electrical conductor.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
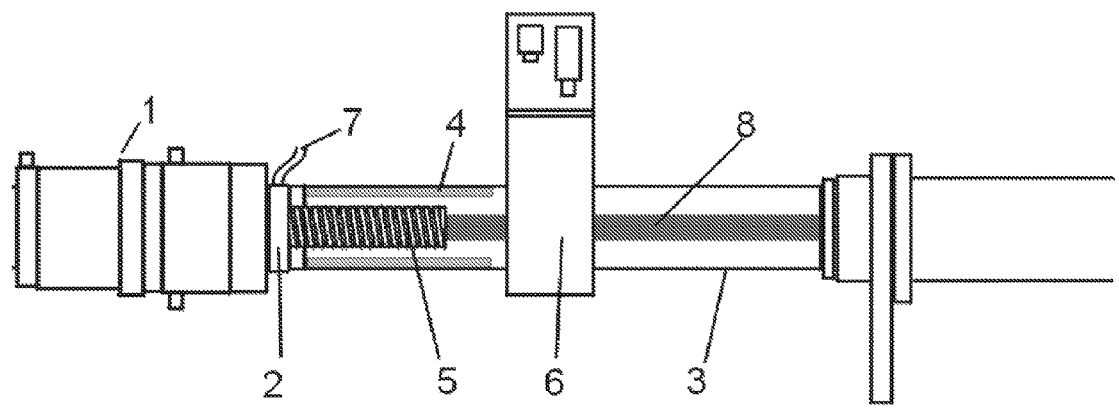
FIG. 1 shows schematically one embodiment of the present invention in operating state.

FIG. 1 is a schematic view of one embodiment of the present invention when the splice box is closed as during production. In FIG. 1 it is shown an extrusion head 1 of a production line for an electrical cable 8 comprising an electrical conductor and one to three layers including an insulation layer surrounding the electrical conductor. In production of electrical cables, layers are extruded on an electrical conductor, which may be copper, aluminum or any other metal suitable for the purpose. After this extrusion, the layers have to be crosslinked in order to provide the desired properties for said insulation layer. For the crosslinking reaction the layers have to be heated to a predetermined temperature. In the present invention, the heating of the layers is at least partly accomplished by inductively heating the electrical conductor.

As shown in FIG. 1, the arrangement of the present invention comprises coil 5 as induction means for generating a magnetic field. The coil 5 is mounted on the extrusion head 1 of the production line downstream of the extrusion head 1. The mounting of the coil 5 to the extrusion head 1 is performed with a support, which in this embodiment is a flange 2, such that the coil 5 is mounted on the flange 2 and the flange 2 is connected to the extrusion head 1. The support may also be any other suitable construction for supporting the coil 5. The flange 2 is further provided with electrical connections 7 for operating the induction means, in this case the coil 5. Instead of a coil 5 also other induction means may be employed for heating the electrical conductor of the electrical cable 8. Also the coil may be possibly connected directly to the extrusion head, in which case also the electrical connections 7 may be connected directly to the coil 5.

The coil 5 is arranged such that it surrounds the electrical cable 8 as the cable 8 comes from the extrusion head 1. Therefore the magnetic field generated by the coil 5 induces a dissipative current to the electrical conductor of the electrical cable 8 for heating the electrical conductor. Heated electrical conductor in turn heats the insulation layer to a temperature necessary for the crosslinking reaction.

The induction means, the coil 5, form the first distinctive part of the arrangement for heating the electrical conductor. The first distinctive part may, as described above, also comprise a support, the flange 2, for supporting the induction means and for mounting the induction means to the extrusion head 1, and electrical connections 7 for operating the induction means.

The present arrangement for heating the electrical conductor comprises also a second distinctive part. This second distinctive part comprises guide means provided in a splice box 3 for directing the magnetic field created with the induction means in order to prevent heating of the splice-box 3 itself. In this particular embodiment shown in FIG. 1, the guide means are ferrite cores 4 arranged in the splice box 3 around the induction means, but any other suitable guide means may be employed to accomplish the same purpose. The ferrite cores 4 or other guide means may be positioned in various ways to provide the function of directing magnetic field towards the electrical conductor.

In the present invention the ferrite cores 4 are mounted in splice box 3 of the production line. The splice box 3 is arranged over the coil 5 such that it surrounds the coil 5. As shown in FIG. 1, in this embodiment of the invention the splice box 3 is removably connected to the flange 2, but when there is no flange 2 or any other support for the coil 5 the slice box 3 may be possible to connect directly to the extrusion head 1. The ferrite cores 4 are preferable integrated to the internal surfaces of the splice box 3. Various techniques and means may be used to mount or integrate the ferrite cores 4 to the splice box 3. The purpose for using the ferrite cores 3 is to avoid inductive heating of the other parts of the production line, such as the splice box 3 or steel tube enclosing the electrical cable 8.

The complete inductive heating arrangement is formed from the two above mentioned distinctive parts arranged downstream of the extrusion head and it is operable when the splice box 3 is connected to the extrusion head 1. In the case of FIG. 1 the first distinctive part is connected to the extrusion head 1 and comprises a support flange 2 with an inductive coil 5 as induction means surrounding the electrical cable 8 and electrical connections 7 for operating the induction means 5, and the second distinctive part comprises ferrite cores 4 as guide means provided in a splice box 3 and surrounding the inductive coil 5 for directing the magnetic field created with the coil 5. In this case the coil 5 mounted to the flange 2 extends inside the splice box 3 in the direction of the electrical cable 8 surrounding the cable 8, and the ferrite cores 4 provided in the splice box 3 surround the coil 5.

In the invention the two distinctive parts of the inductive heating arrangement are provided inside a splice box 3, which enables to change the induction means, the coil, easily since the splice box may be opened. Therefore there is no longer need to remove additional equipments, such as X-ray devices, from the production line for disassembly of the extrusion head and/or the post-heater.

Figure 2:
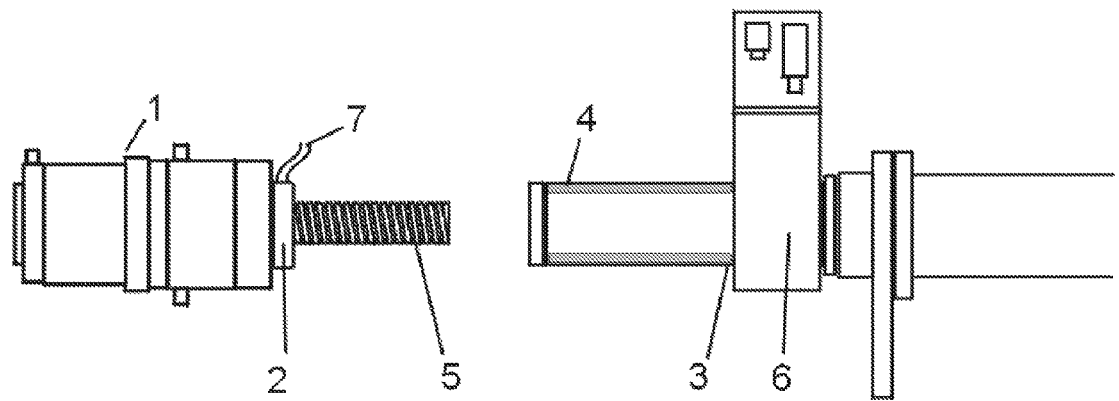
FIG. 2 shows the embodiment of FIG. 1 when the splice box is opened.

FIG. 2 shows the embodiment of the FIG. 1 when the splice box 3 is opened for changing the coil after the production line is shut-down. In that case an X-ray device 6 is provided in the splice box 3 between the respective ends of the splice box 3, as shown in FIG. 2. When the splice box 3 is opened it is moved way from the extrusion head 1 so that the coil 5 is exposed. Then the coil 5 may be changed or the extrusion head 1 may be dissembled for maintenance without removing the X-ray device 6. This way also a conductor joint may be done without removing the X-ray device 6 or the coil 5.

Mentioned X-ray measuring device 6 may be provided as part of the splice box 3 or as an extension of the splice box 3, as is shown in FIG. 1. Also any other additional device may be provided instead of the X-ray measuring device 6 as part of the splice box 3 or as an extension of the splice box 3.

Figure 3:
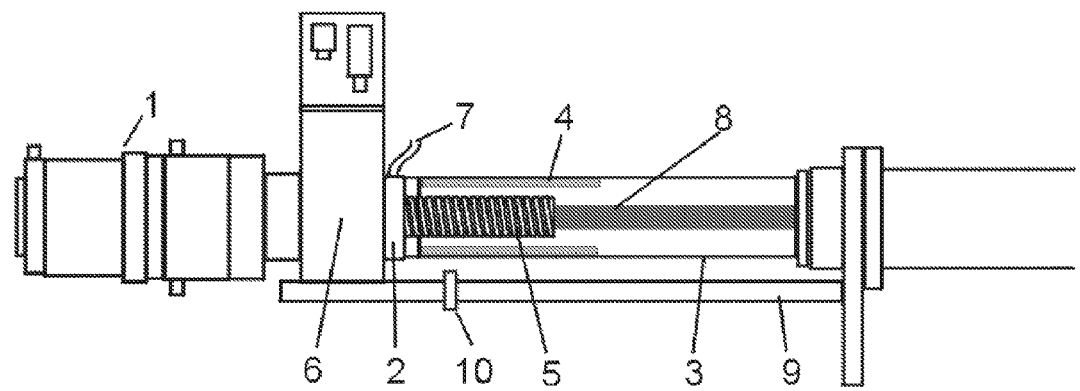
FIG. 3 shows schematically another embodiment of the invention in operating state.
Figure 4:
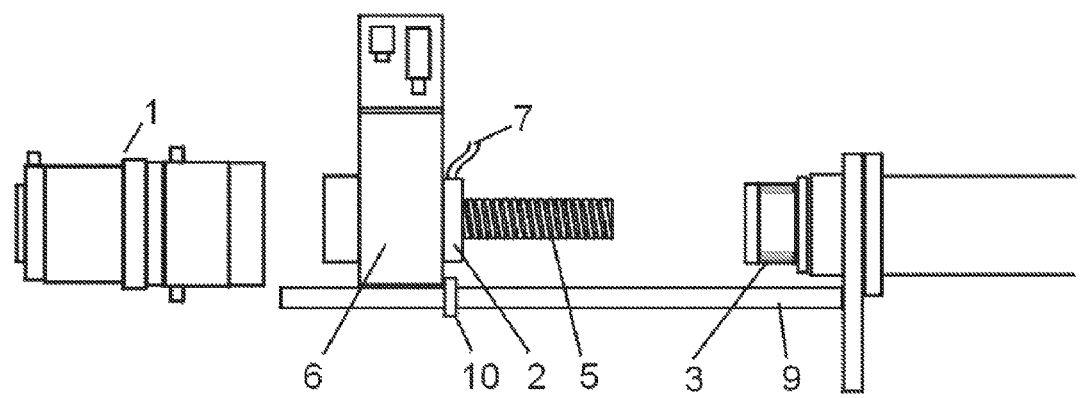
FIG. 4 shows the embodiment of FIG. 3 when the splice box is opened.
Figure 5:
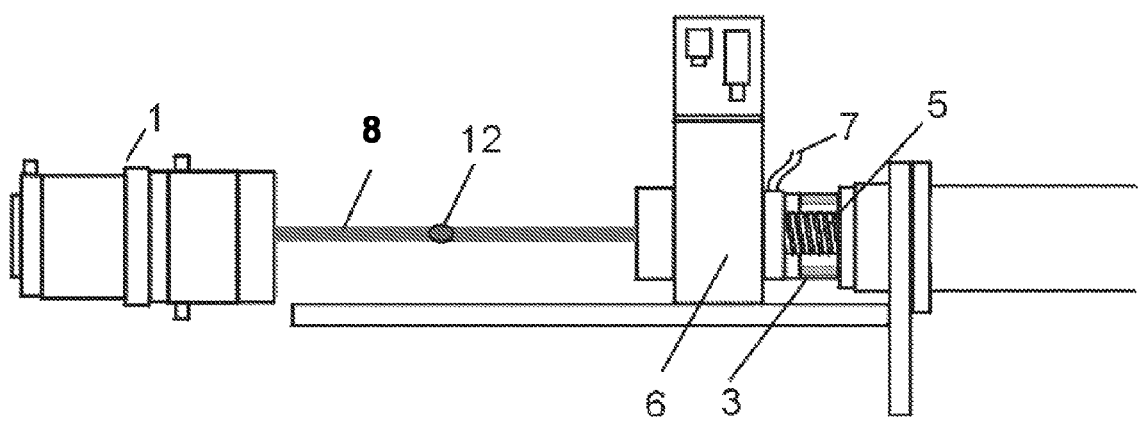
FIG. 5 shows the embodiment of FIG. 3 during conductor joint.

FIGS. 3, 4 and 5 show another embodiment of the present invention. In this embodiment the X-ray device 6 is arranged directly after the extrusion head 1 and the coil 5 is provided after the X-ray device 6, as shown in FIG. 3. Guiding means, ferrite cores 5, are provided in the splice box 3, as in the embodiment of FIGS. 1 and 2. X-ray device 6 is removably connected to the downstream side of the extrusion head 1 and the coil 5 is connected to the X-ray device 6 using flange 2 or some other suitable means. Flange 2 is provided with electrical connections 7. Coil 5 surrounds the cable 8 for heating the conductor and the splice box 3 is arranged around the coil 5, when the splice box 3 is closed. With this arrangement the X-ray device can measure cable 8 dimensions right after the extrusion head 1 and for instance vibrations do not affect the readings.

This embodiment of FIG. 3 comprises also support means 9 for supporting the X-ray device 6 together with the coil 5. In this FIG. 3 the post-heater assembly is shown in operating state. These support means 9 are arranged such that X-ray device 6 and the coil 5 may be moved along the support means 9 downwards from the extrusion head 1. In a preferred embodiment these support means 9 are guiding bars for guiding the X-ray device and the coil 5 when the splice box 3 is opened. These support means 9 may further comprise a stopper 10 for limiting the movement of the X-ray device 6 along the support means 9. This way the X-ray device 6 may be moved a predetermined distance, determined by the stopper, along the support means 9. Stopper 10 may be any means for limiting the moving of the X-ray device 6. Support means 9 may also be arranged without any stopper 10.

FIG. 4 shows the embodiment of FIG. 3 during coil change and/or during extrusion head disassembly. In this situation the X-ray device 6 is moved downwards from the extrusion head 1 a distance determined by the stopper 10 and the splice box 3 is fully or at least partly opened. Thus, the X-ray device 6 is disconnected from the extrusion head 1 and the extrusion head 1 may be disassembled and simultaneously the coil 5 may be changed by disconnecting it from the X-ray device 6.

FIG. 5 shows the embodiment of FIG. 3 during conductor joint and/or during extrusion head disassembly. In this situation the X-ray device 6 is disconnected from the extrusion head 1 and the splice box 3 is opened. The X-ray device 6 and the coil 5 may be moved along the support means 9 together with the splice box 3 when the splice box 3 is opened. When the splice box 3 is opened and the X-ray device 6 moved with the coil 5 downwards from the extrusion head 1, the cable 8 may be accessed for making a joint 12 or the extrusion head 1 may be disassembled, as shown in FIG. 5.

The modular approach of the arrangement of the present invention for heating electrical conductor downstream of an extrusion head is constructed so as that the induction means for generating a magnetic field and the guide means for guiding the magnetic field form two distinctive parts of the post-heater. The above construction allows the utilization of the splice box for heating the conductor downstream of the extrusion head. In that the case the coil and the ferrite cores do not form an integral part so that more freedom is created for maintenance and changes of the post-heater.

The present invention relates also to a method for heating an electrical conductor downstream of an extrusion head 1 in production line of electrical cables. In the method, a single insulation layer or several layers together are extruded in an extrusion head on the electrical conductor to produce an electrical cable. After the extrusion step the insulation layer needs to be heated to a predetermined temperature for crosslinking reaction to occur in the insulation layer. This heating is accomplished at least partly by creating a magnetic field by induction means mounted downstream of the extrusion head. In a preferred embodiment the magnetic filed is created by a coil arranged around the electrical cable. The induction means are operated by electrical connections such that the induction means induce a dissipative current to the electrical conductor. This current heats the electrical conductor.

Furthermore, the magnetic field created with the induction means is directed by guide means provided in a splice box in order to prevent heating of the splice-box itself. In the preferred embodiment, ferrite cores are used as guide means to direct the magnetic field and to avoid inductive heating of other parts of the production line. The method simplifies the post-heating of the electrical conductor of the electrical cable so as to provide more efficient crosslinking of the insulation layer and more efficient production of electrical cable.

The properties of the produced cable 8 may be measuring with an X-ray device 6 provided downstream of the induction means 5 and arranged in the splice box 3. Alternatively the properties of the cable 8 may be measured with an X-ray device 6 provided upstream of the induction means 5 and connected to the extrusion head 1.

It will be obvious to a person skilled in the art that, as the technology advances, the inventive concept can be implemented in various ways. The invention and its embodiments are not limited to the examples described above but may vary within the scope of the claims.

The invention claimed is:

1. A device for manufacturing an electrical cable having an insulation layer on an electrical conductor, the device comprising:
   an extrusion head for extruding the insulation layer on the electrical conductor;
   a first distinctive part comprising an induction means for generating a magnetic field and heating the electrical conductor, the induction means being mounted on the extrusion head;
   a second distinctive part comprising a splice box and a guide means for directing the magnetic field created with the induction means, the guide means being disposed within the splice box; wherein:
   when the splice box is in a closed position, the guide means surrounds the induction means,
   when the splice box is in an opened position, the induction means is exposed, and
   the splice box moves relative to and separate from the induction means when the splice box is moved between the closed position and the opened position.

2. The device according to claim 1, wherein the induction means is a coil arranged around the electrical cable.

3. The device according to claim 1, wherein the first distinctive part further comprises a support for supporting the induction means.

4. The device according to claim 1, wherein the first distinctive part further comprises electrical connections for operating the induction means.

5. The device according to claim 1, wherein the guide means are ferrite cores surrounding the induction means to protect the splice-box from heating.

6. The device according to claim 3, wherein the support is a flange connected to the extrusion head.

7. The device according to claim 1, wherein the first distinctive part further comprises:
   a support flange with an inductive coil surrounding the electrical cable as the induction means and electrical connections for operating the induction means, and
   the second distinctive part comprises ferrite cores as the guide means, the guide means protecting the splice-box from heating.

8. The device according to claim 1, the splice box further comprising an X-ray measuring device.

9. The device according to claim 8, wherein the X-ray measuring device is arranged downstream of the induction means.

10. The device according to claim 8, wherein the X-ray measuring device is arranged between ends of the splice box.

11. The device according to claim 1, wherein the X-ray measuring device is arranged upstream of the induction means.

12. The device according to claim 11, wherein the X-ray measuring device is removably connected to the extrusion head.

13. The device according to claim 3, wherein the support is a flange connected to a downstream side of an X-ray device.

14. The device according to claim 10, wherein the device further comprises support means for moving away from the extrusion head and supporting the X-ray device and the induction means when the splice box is in the opened position.

15. The device according to claim 14, wherein the support means comprises a stopper for limiting movement of the X-ray device and the induction means when splice box is moved to the opened position.

16. The device according to claim 14, wherein the support means is guiding bars.

17. The device according to claim 3, wherein electrical connections are provided in the support.

18. A method for inductively heating an electrical conductor after an extrusion head in a process of manufacturing electrical cables having an insulation layer surrounding the electrical conductor, the method comprising steps of:
- extruding a insulation layer through the extrusion head on the electrical conductor in order to produce an electrical cable;
- creating a magnetic field by induction means mounted on the extrusion head, and
- directing the magnetic field created with the induction means by guide means, the guide means being provided in a splice box that is capable of providing relative movement between the splice box and the induction means when the splice box transitions between a closed position, wherein the guide means surrounds the induction means, and an opened position, wherein the guide means does not surround the induction means, and the guide means directs the magnetic field when the splice box is in the closed position.

19. A method according to claim 18, wherein the magnetic filed is created by a coil arranged around the electrical cable.

20. A method according to claim 18, wherein the induction means are operated by electrical connections.

21. A method according to claim 18, wherein the guide means comprises ferrite cores to protect external parts from heating when the splice box is in the closed position.

22. A method according to claim 18, wherein properties of the cable are measured with an X-ray device provided downstream of the induction means and arranged in the splice box.

23. A method according to claim 18, wherein properties of the cable are measured with an X-ray device provided upstream of the induction means and connected to the extrusion head.

* * * * *